US008850402B2

(12) United States Patent
Heisch et al.

(10) Patent No.: US 8,850,402 B2
(45) Date of Patent: Sep. 30, 2014

(54) DETERMINING PERFORMANCE OF A SOFTWARE ENTITY

(75) Inventors: Randall Ray Heisch, Georgetown, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 12/470,705

(22) Filed: May 22, 2009

(65) Prior Publication Data

US 2010/0299655 A1 Nov. 25, 2010

(51) Int. Cl.
*G06F 9/44* (2006.01)
*G06F 11/34* (2006.01)

(52) U.S. Cl.
CPC ...... *G06F 11/3409* (2013.01); *G06F 2201/865* (2013.01); *G06F 2201/86* (2013.01); *G06F 2201/88* (2013.01); *G06F 11/3466* (2013.01); *G06F 2201/885* (2013.01); *G06F 2201/815* (2013.01)
USPC .......................................... 717/130; 717/131

(58) Field of Classification Search
CPC ............................. G06F 11/362; G06F 11/3466
USPC .............................................................. 717/130
See application file for complete search history.

(56) References Cited

U.S. PATENT DOCUMENTS

| | | | |
|---|---|---|---|
| 5,710,724 A * | 1/1998 | Burrows .......................... | 714/34 |
| 5,768,500 A | 6/1998 | Agrawal et al. | |
| 6,092,180 A | 7/2000 | Anderson et al. | |
| 6,662,358 B1 | 12/2003 | Berry et al. | |
| 7,165,242 B2 * | 1/2007 | Dmitriev ........................ | 717/130 |
| 7,194,732 B2 * | 3/2007 | Fisher et al. ................... | 717/131 |
| 7,478,371 B1 * | 1/2009 | Gove ............................. | 717/128 |
| 2004/0117796 A1 * | 6/2004 | Dichter .......................... | 718/107 |
| 2005/0081107 A1 | 4/2005 | De Witt et al. | |
| 2006/0218533 A1 * | 9/2006 | Koduru et al. ................ | 717/124 |
| 2006/0242636 A1 * | 10/2006 | Chilimbi et al. .............. | 717/158 |
| 2006/0259830 A1 | 11/2006 | Blevin et al. | |
| 2007/0074081 A1 * | 3/2007 | DeWitt et al. ................... | 714/45 |

(Continued)

FOREIGN PATENT DOCUMENTS

WO 2008058292 A2 5/2008

OTHER PUBLICATIONS

Whitehead, Nicholas; "Java Run-Time Monitoring Part 1: Run-time Performance and Availability Monitoring for Java Systems" Jul. 29, 2008; International Business Machines, USA.

(Continued)

*Primary Examiner* — Anna Deng
*Assistant Examiner* — Brahim Bourzik
(74) *Attorney, Agent, or Firm* — D'Ambrosio & Menon, PLLC; Usha Menon

(57) ABSTRACT

Methods, systems, and products for determining performance of a software entity running on a data processing system. The method comprises allowing extended execution of the software entity without monitoring code. The method also comprises intermittently sampling behavior data for the software entity. Intermittently sampling behavior data may be carried out by injecting monitoring code into the software entity to instrument the software entity, collecting behavior data by utilizing the monitoring code, and removing the monitoring code. The method also comprises repeatedly performing iterations of the allowing and sampling steps until collected behavior data is sufficient for diagnosing performance of the software entity. The method may further comprise analyzing the collected behavior data to diagnose performance of the software entity.

15 Claims, 7 Drawing Sheets

(56) References Cited

U.S. PATENT DOCUMENTS

| | | | |
|---|---|---|---|
| 2008/0005208 A1* | 1/2008 | Vaswani et al. | 707/206 |
| 2009/0083716 A1* | 3/2009 | Kimura | 717/129 |
| 2010/0083234 A1* | 4/2010 | Rabin | 717/127 |

OTHER PUBLICATIONS

Suganuma, Toshio; Nagatani, Toshio; Komatsu, Hideaki; Kawahito, Motohiro; Yasue, Toshiaki; "Design and Evaluation of Dynamic Optimizations for a Java Just in Time Compiler"; ACM Transactions on Programming Languages and Systems; vol. 27, Issue 4; Jul. 2005; pp. 732-785; International Business Machines Tokyo Research Laboratory; Tokyo, Japan.

Liblit, Benjamin, Robert; "Cooperative Bug Isolation" University of California, Berkeley; Fall 2004; 172 Pages; Berkeley, California, USA.

Schneider, Florian; Payer, Mathias; Gross, Thomas; "Online Optimizations Driven by Hardware Performance Monitoring" 10 pages; 2007; ETH Zurich, Department of Computer Science; Zurich Switzerland.

Gonzales, M.; Serra, A.; Martorell, X.; Oliver, J.; Ayguade, E.; Labarta, J.; Navarro, N. "Applying Interposition Techniques for Performance Analysis of OPENMP Parallel Applications"; Parallel and Distributed Processing Symposium; 2000. IPDPS 2000. Proceedings. 14th International Volume, Issue, 2000 pp. 235-240.

\* cited by examiner

DETERMINING PERFORMANCE OF A SOFTWARE ENTITY

BACKGROUND

Instrumenting a section of code, or software entity, with monitoring code is a common approach to extracting software behavior data for performance analysis. The section of code monitored may be a few instructions or an entire procedure. Extracted behavior data may then be utilized in analyzing the performance of the software entity. To instrument the code, hooks may be added before entering or after exiting the section of code (software entity). These hooks temporarily pass control to monitoring routines that collect, process, and/or save the behavior data. Each time a system processor executes the code of the software entity, the processor executes the monitoring code, thereby adding to the collection of behavior data.

SUMMARY

Methods, systems, and products for determining performance of a software entity running on a data processing system are disclosed herein. The method comprises allowing extended execution of the software entity without monitoring code. The method also comprises intermittently sampling behavior data for the software entity. Intermittently sampling behavior data may be carried out by injecting monitoring code into the software entity to instrument the software entity, collecting behavior data by utilizing the monitoring code, and removing the monitoring code. The method also comprises repeatedly performing iterations of the allowing and sampling steps until collected behavior data is sufficient for diagnosing performance of the software entity. The method may further comprise analyzing the collected behavior data to diagnose performance of the software entity.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Exemplary methods, systems, and design structures for determining performance of a software entity running on a data processing system are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

Figure 1A:
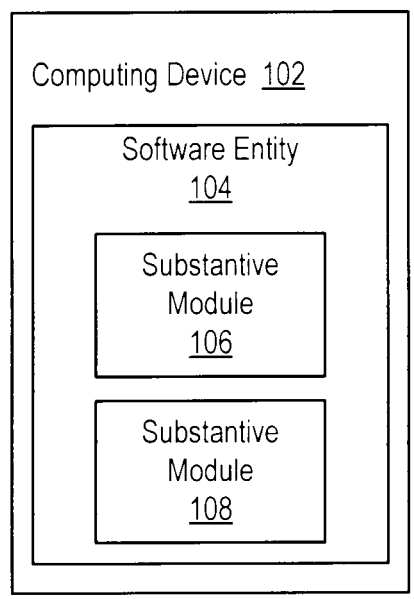
FIG. 1A illustrates a direct operating system call from a software entity to the current operating system in accordance with one embodiment of the invention.
Figure 1B:
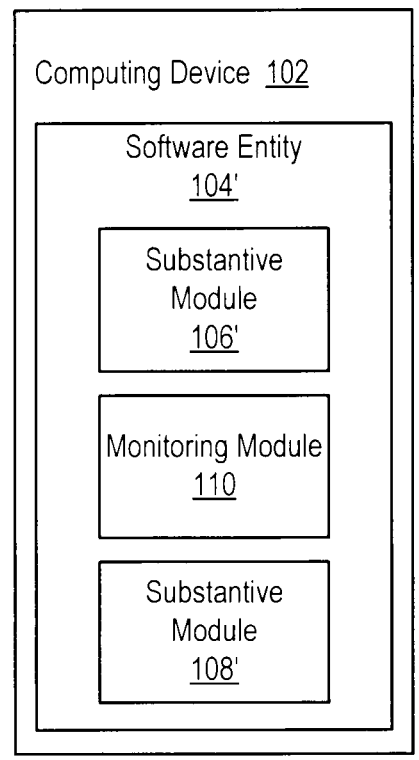
FIG. 1B illustrates an indirect operating system call from a software entity to the current operating system of the data processing system in accordance with one embodiment of the invention.

FIG. 1A illustrates a computing device 102 executing a software entity 104 containing substantive modules 106 and 108. Substantive modules 106 and 108 may be any type of useful software such as various software applications, background processes, and so on as will occur to those of ordinary skill in the art. FIG. 1B illustrates the same computing device 102 executing a software entity 104' containing substantive modules 106' and 108', which are identical to substantive modules 106 and 108. However, software entity 104' has additionally been instrumented with monitoring module 110. Monitoring module 110 collects behavior data from one or more of the substantive modules 106', 108' of software entity 104' for determining the software entity's 104' performance. Monitoring module 110 is located at pre-selected strategic locations to collect the most valuable behavior data.

However, the overhead associated with monitoring module 110 (as well as any hooks used to implement the monitoring module 110) may be sufficient to bias program behavior for software entity 104' and thus influence results of performance analysis. The added overhead may also extend the runtime of the program to such a degree as to render the approach unusable. To increase accuracy and usability of the monitoring module 110, embodiments of the present invention nominally operate in the configuration depicted in FIG. 1A to generate behavior data typical to nominal operation. Intermittently (e.g. periodically), embodiments of the invention operate in the configuration of FIG. 1B to collect limited samples of the typical behavior data generated by nominal operation by executing monitoring module 110 in its entirety. For example, monitoring module 110 may be executed so that the module collects only a single sample of behavior data (although the sample may contain a variety of behavior data). By collecting limited samples over a sufficient period of time, the samples of behavior data accumulated over time may then be analyzed to accurately diagnose performance of the software entity with little or no processing overhead or additional run time.

Shifting to the configuration of FIG. 1B is carried out by instrumenting the software entity 104' with monitoring module 110. When the instrumented code is executed, it initializes whatever resources it needs (such as performance monitor counters, etc.) and runs the instrumented code section, then collects (or processes or saves) any performance data it is intended to monitor. It is then uninstrumented, such that on the next invocation of the previously instrumented code, no instrumentation is present (for example, no instrumentation hooks are run and no instrumented code is executed).

Extended execution of the software entity 104 generates accurate behavior data. Intended execution of the software entity without monitoring code may be defined as execution of the software entity to an extent negating overhead affects attributable to the monitoring code. In some implementations, extended execution of the software entity without monitoring code may comprise maintaining a ratio of execution of instances of the software entity without monitoring code to execution of instances of the software entity with monitoring code of at least 10:1. In other implementations, the ratio may be 100:1, 1000:1, or higher. Maintaining the appropriate ratio may be carried out directly, or by tuning execution by adjusting counter variables, interrupt triggers, or timers as described in further detail below.

Figure 2:
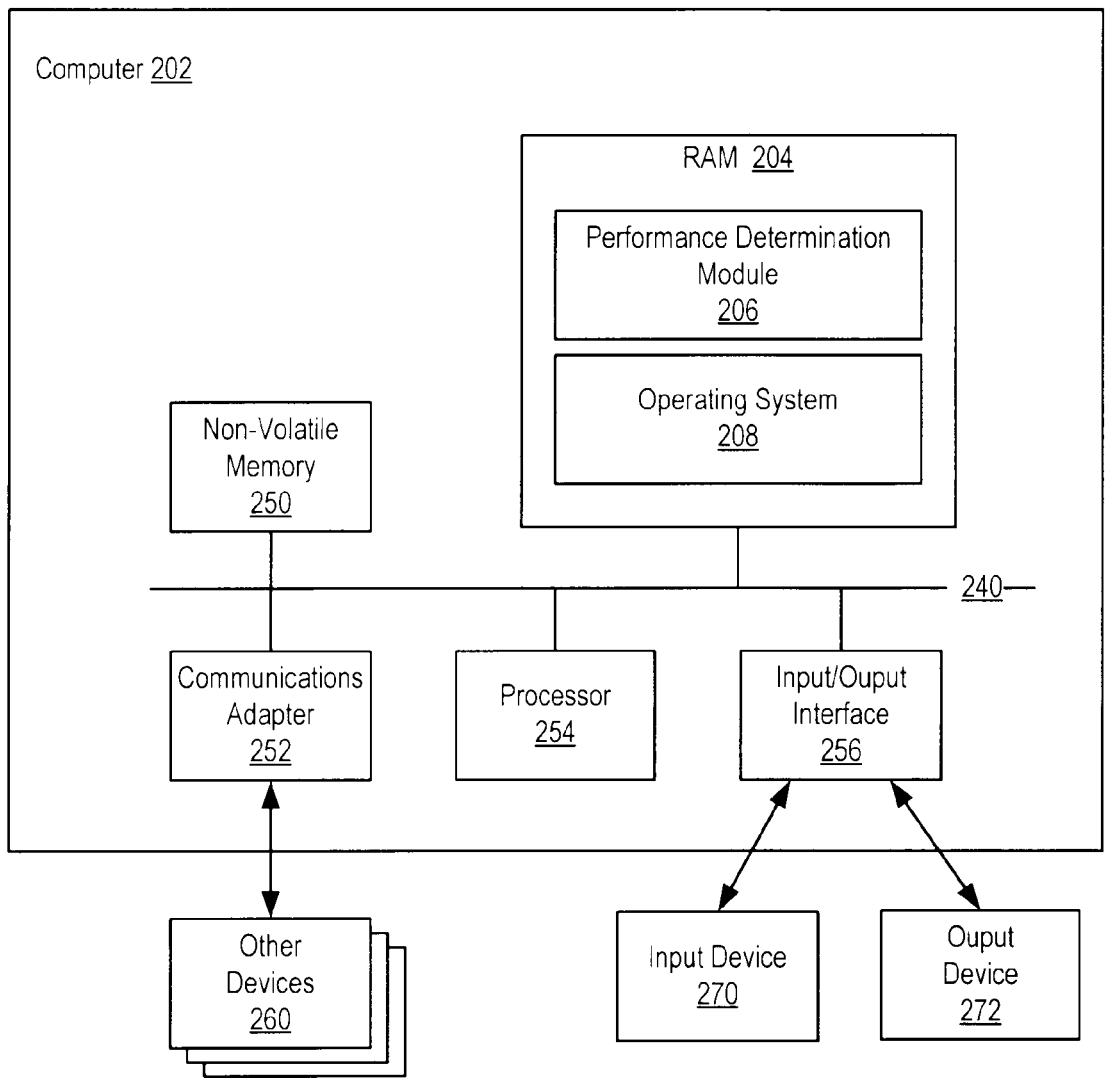
FIG. 2 sets forth a block diagram of an exemplary computer in accordance with one embodiment of the invention.

Embodiments of the presently disclosed invention are implemented to some extent as software modules installed and running on one or more data processing systems ('computing devices'), such as servers, workstations, tablet computers, PCs, personal digital assistants ('PDAs'), smart phones, and so on. FIG. 2 sets forth a block diagram of an exemplary computer 202. Computing device 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory may be connected through a system bus 240 to the processor 254 and to other system components. Thus, the software modules may be program instructions stored in computer memory.

An operating system 208 is stored in computer memory. Operating system 208 may be any appropriate operating system such as Windows XP, Windows Vista, Mac OS X, UNIX, LINUX, or AIX from International Business Machines Corporation (Armonk, N.Y.).

Computing device 202 may also include one or more input/output interface adapters 256. Input/output interface adapters 256 may implement user-oriented input/output through software drivers and computer hardware for controlling output to output devices 272 such as computer display screens, as well as user input from input devices 270, such as keyboards and mice.

Computing device 202 may also include a communications adapter 252 for implementing data communications with other devices 260. Communications adapter 252 implements the hardware level of data communications through which one computer sends data communications to another computer through a network.

Also stored in computer memory is a performance determination module 206, which may operate in kernel mode. The performance determination module 206 includes computer program instructions for allowing extended execution of the software entity without monitoring code. The module also includes computer program instructions for intermittently sampling behavior data for the software entity, comprising: computer program instructions for injecting monitoring code into the software entity to instrument the software entity; computer program instructions for collecting behavior data by utilizing the monitoring code; and computer program instructions for removing the monitoring code. The performance determination module may also include computer program instructions for repeatedly performing iterations of the allowing and sampling steps until the collected behavior data is sufficient for diagnosing performance of the software entity.

Performance determination module 206 may be implemented as one or more sub-modules operating in separate software layers or in the same layer. Although depicted as a separate module from the operating system in FIG. 2, the performance determination module 206 or one or more of the sub-modules may be incorporated as part of the operating system 208. In particular, one or more of the sub-modules may be incorporated as part of an interrupt handler. In some embodiments, the performance determination module 206 may be implemented in the software stack, in hardware, in firmware (such as in the BIOS), or in any other manner as will occur to those of ordinary skill in the art.

Figure 3:
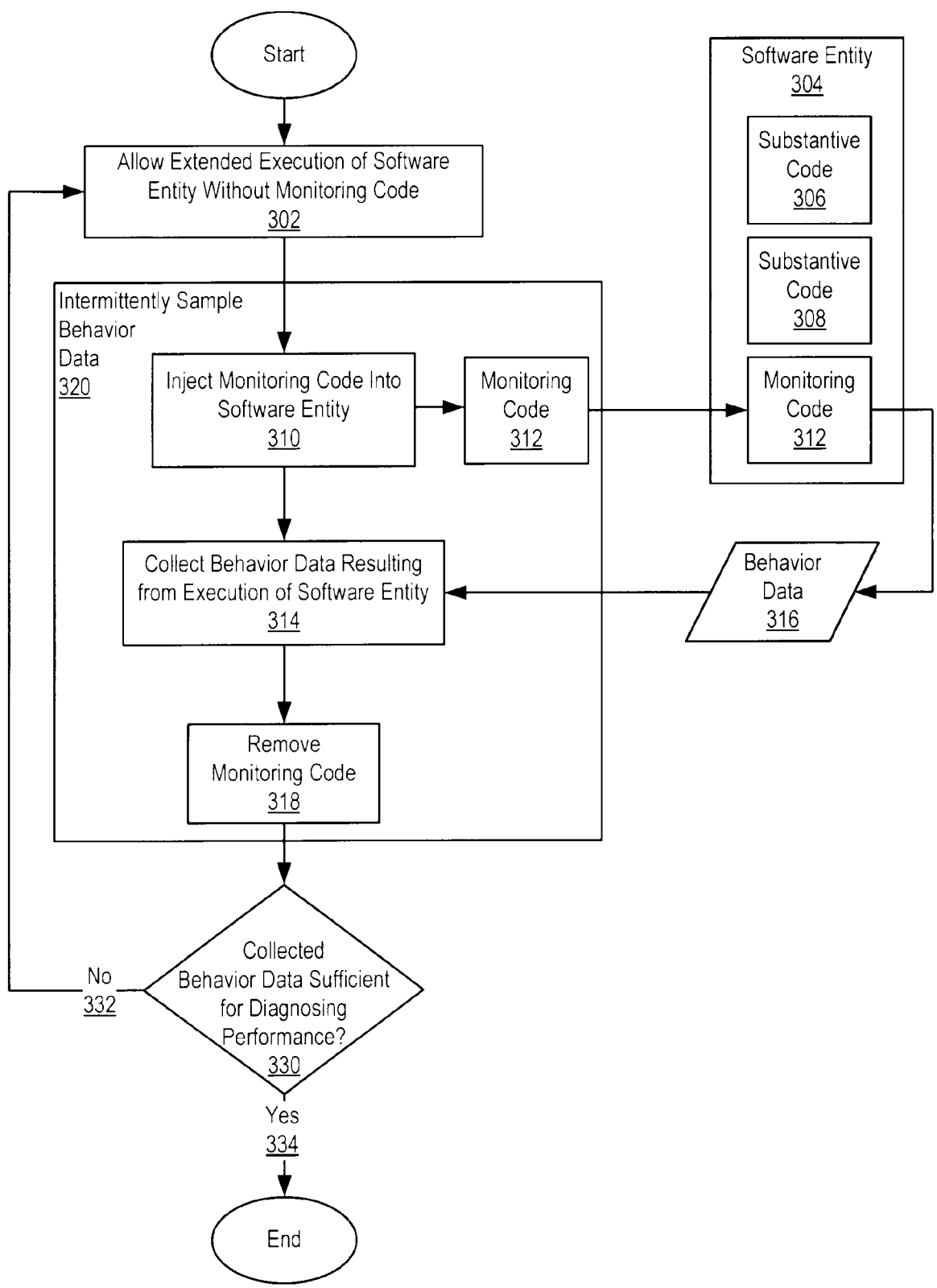
FIG. 3 sets forth a data flow diagram illustrating an exemplary software architecture for discovering software incompatibilities in accordance with one embodiment of the invention.

FIG. 3 is a data flow diagram illustrating a method for determining performance of a software entity running on a data processing system in accordance with one embodiment of the invention. The method of FIG. 3 includes allowing extended execution of the software entity 304 without monitoring code 312 (block 302). Thus, the software entity 304 includes only substantive code 306, 308. The method also includes intermittently sampling behavior data for the software entity 304 (block 320). Sampling intermittently includes sampling at intervals. The intervals may be regular or irregular. For example, the interval may be defined by a number of time slice interrupts, which entail regular periods of time for which the uninstrumented software entity 304 is allowed to run. Such an interval may last from 1 to 10 seconds, for example. An interval may be defined by periods of time, iterations of a routine, a triggering event, a specific number of triggering events, expiration of a counter, and so on as will occur to those of ordinary skill in the art. In some implementations, the intervals may be varied by a control mechanism to a desired length.

The method also includes repeatedly performing iterations of the allowing and sampling steps until collected behavior data 316 is sufficient for diagnosing performance of the software entity 304 (decision 330). If the collected behavior data is not sufficient for diagnosing performance of the software entity (332), another iteration of the allowing 302 and sampling 320 steps are performed. If the collected behavior data is sufficient for diagnosing performance of the software entity (334), the monitoring process ends, and the software entity returns to nominal execution. In other implementations, the monitoring process may continue indefinitely to continually monitor software entity 304, particularly if the overhead of the monitoring process as implemented is low. In some embodiments, the method includes analyzing the collected behavior data to diagnose performance of the software entity. Analyzing the collected behavior data may be carried out by extrapolating or interpolating the collected behavior data.

The method may also include presenting the collected behavior data or the results of the analysis.

Sufficiency of collected behavior data may be defined in terms of the number of samples and/or quality of samples. For example, collected behavior data may be sufficient if a particular number of samples are included and if the samples are sufficiently random. Irregular intervals may be used to increase the randomness of behavior data by avoiding timing-induced patterns. The method may include profiling representative samples to ensure randomness. In some implementations, the method may include screening, sorting, or other measures to insure sufficient randomness in the collected behavior data. Sufficiency may also be determined indirectly, such as by implementing timing, iterative, or event-triggered mechanisms.

Intermittently sampling behavior data for the software entity 304 (block 320) is carried out by injecting monitoring code 312 into the software entity 304 to instrument the software entity (block 310). Monitoring code may include lightweight processes or heavyweight processes, such as processes for measuring cache misses, flops, or energy use. Intermittently sampling behavior data for the software entity 304 (block 320) also comprises collecting behavior data 316 by utilizing the monitoring code 312 (block 314); and removing the monitoring code 312 (block 318).

Figure 4:
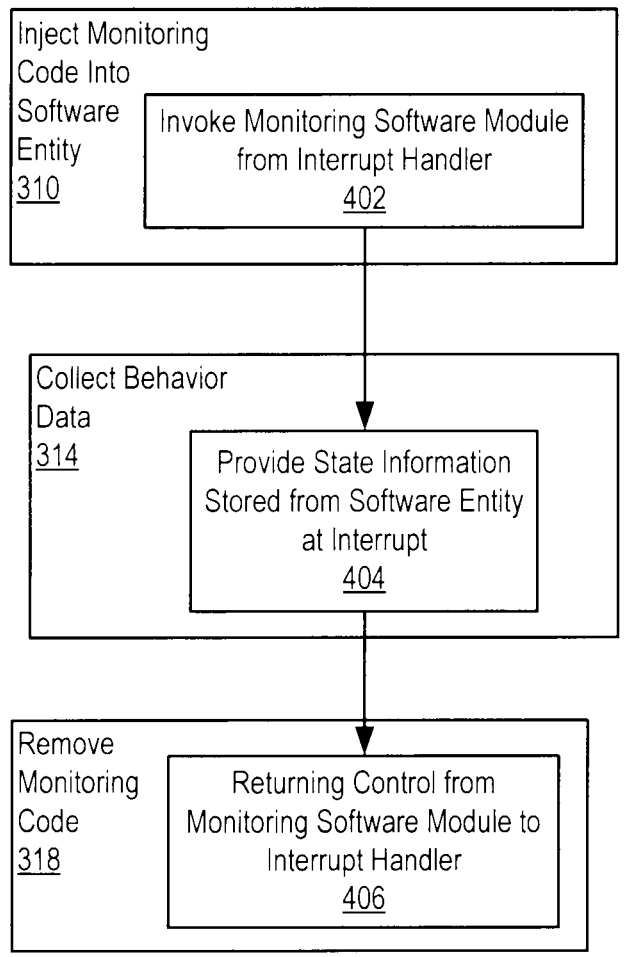
FIG. 4 is a data flow diagram illustrating a method for discovering software incompatibilities created by differences between a current operating system and a new operating system in accordance with one embodiment of the invention.
Figure 5:
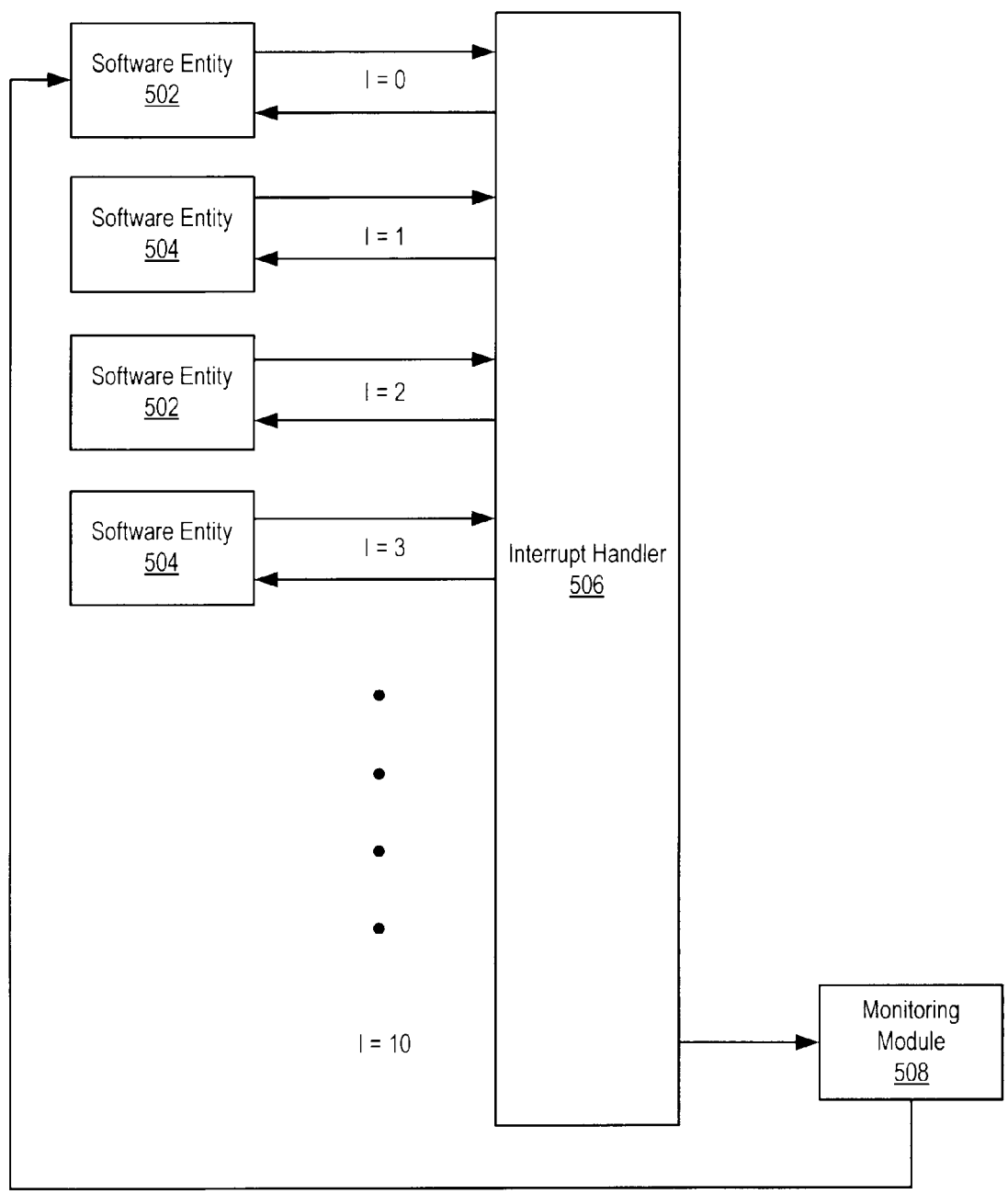
FIG. 5 is a data flow diagram illustrating recording the detected calls in a data structure in accordance with one embodiment of the invention.

FIG. 4 is a data flow diagram illustrating a method for intermittently sampling behavior data for the software entity in accordance with one embodiment of the invention. FIG. 5 illustrates data flow in a software architecture in accordance with one embodiment of the invention. Referring to FIG. 4, injecting monitoring code into the software entity (block 310) may be carried out by invoking from an interrupt handler, upon an interrupt, a monitoring software module comprising the monitoring code (block 402). The interrupt handler includes extensions to call the monitoring software module. For example, the interrupt handler may make a call to an application programming interface ('API') library to invoke the monitoring module (e.g., a method, procedure, or function).

Collecting behavior data by utilizing the monitoring code (block 314) is carried out by providing state information stored from the software entity at interrupt to the monitoring software module (block 404). State information may include the minimal set of contextual data used by a task (e.g., thread or process) that must be saved to allow a task interruption and a continuation at the point or interruption at an arbitrary future time, but may also be modified to include additional data useful for sampling. The interrupt handler extension allows the interrupt handler to pass the state information generated from the execution of the non-instrumented software entity to the monitoring software module. For example, the interrupt may copy state information in hardware registers to a special location available to the monitoring software module in addition to a process control block, or may pass state information from the process control block to the monitoring software module.

Removing the monitoring code (block 318) is carried out by returning control from the monitoring software module to the interrupt handler (block 406). Upon exiting, for example, the method, state information is passed back to the interrupt handler (or the interrupt handler retrieves information stored in the process control block) and the interrupt handler updates the hardware registers with these values.

Referring to FIG. 5, the interrupt handler 506 performs context switches between software entity 502 and software entity 504, allowing each process extended execution. At each interrupt, the interrupt handler tests to see if the expression i=10 is true. If this value is false, the interrupt handler performs a typical context switch and increments i. When the expression is true, the interrupt handler 506 calls monitoring module 508 to sample behavior data as described above with reference to FIG. 4. When monitoring module 508 returns, the interrupt handler 506 resets the counter to i=0, and resumes normal handler functionality. The interrupt handler 506 may also be triggered to call the monitoring module 508 by the use of flag or communications from external modules.

Figure 6:
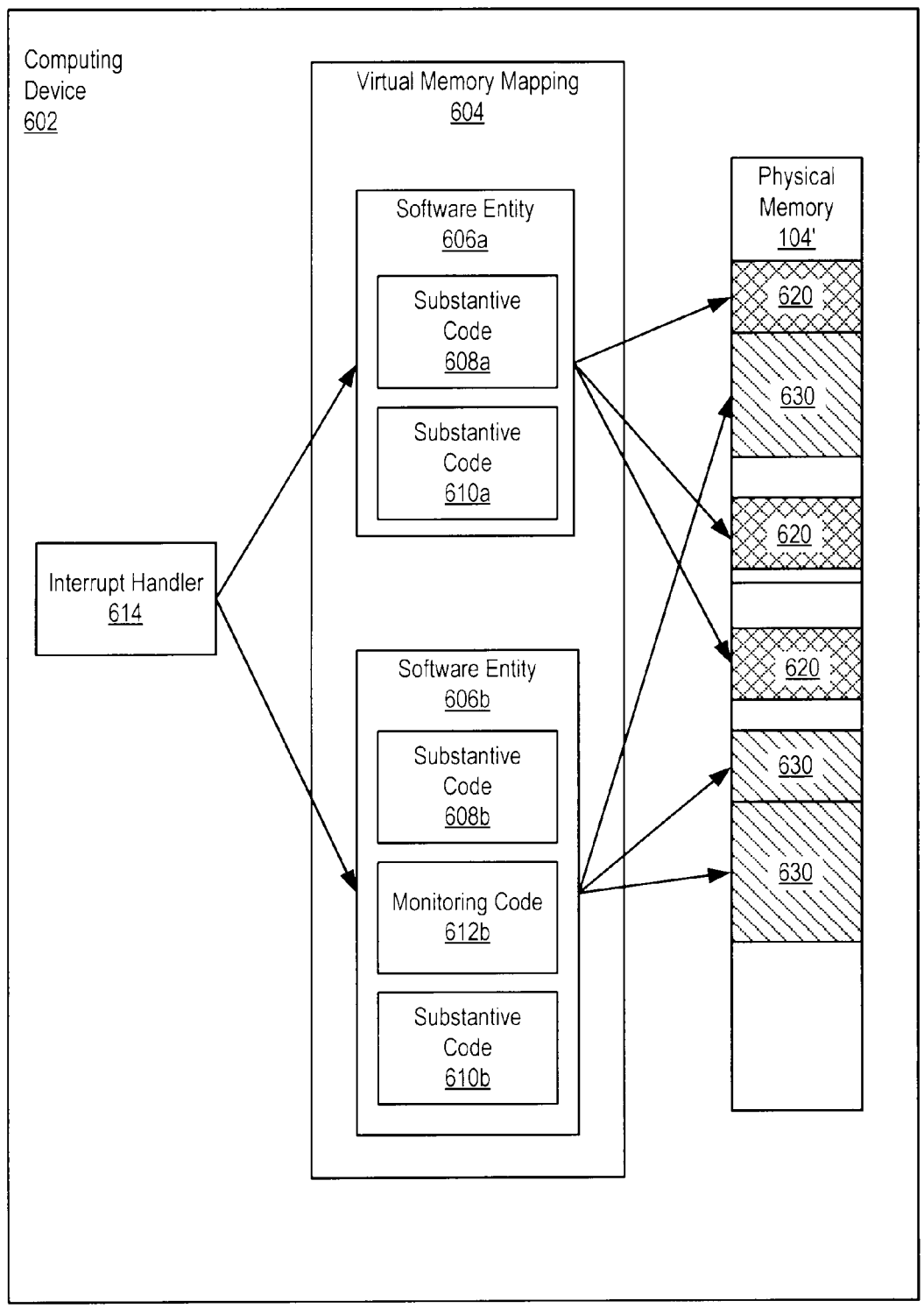
FIG. 6 is a data flow diagram illustrating a method for discovering software incompatibilities in accordance with one embodiment of the invention.
Figure 7:
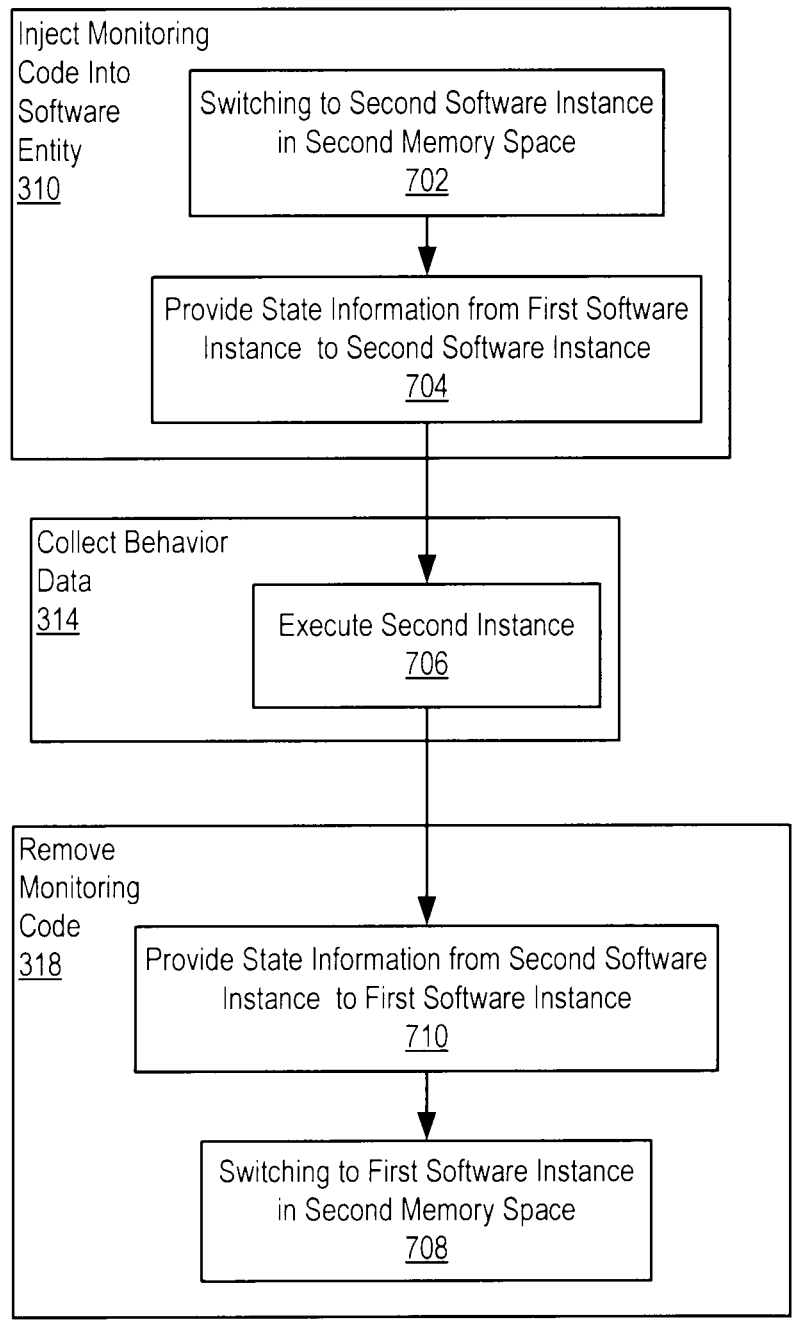
FIG. 7 is a data flow diagram illustrating a method for intermittently sampling behavior data for the software entity in accordance with one embodiment of the invention.

FIG. 6 illustrates data flow in a software architecture in accordance with one embodiment of the invention. FIG. 7 is a data flow diagram illustrating a method for intermittently sampling behavior data for the software entity in accordance with one embodiment of the invention. Referring to FIG. 6, a first, non-instrumented instance of the software entity 606a is mapped to a first memory space using techniques employing virtual memory 604 and a second, instrumented instance of the software 606b with monitoring code 612b added is mapped to a second memory space using virtual memory techniques. Both the first instance of the software entity 606a and the second instance of the software entity 606b contain substantive modules 608a, 610a and 608b, 610b, respectively.

Virtual memory management provides an abstraction between the virtual addresses (addresses used directly by the program) and the physical addresses in memory. The mappings may exist on a page basis. The size of a page may be 2048 bytes, 4096 bytes, 8192 bytes, or many more, including millions of bytes.

Embodiments of the present disclosure leverage aliasing pages with virtual memory. Consider an exemplary executable file, a.out. The executable file a.out is 65536 bytes in size, and is apportioned as follows:

| byte offset | name |
|---|---|
| 0 | start |
| 1024 | functiona |
| 2048 | functionb |
| 4096 | functionc |
| 6440 | functiond |
| 12000 | functione |
| 16000 | data |

The executable file above has six functions, along with other software modules. When the executable is loaded into memory, it is "mapped" from the file into system memory, possibly by using an offset. So, the function start might be observed in the virtual memory for the program at a hexadecimal address 0x10000000. If that is the case, functiona will be at the address 0x10000000+1024 (using base 10 notation). If the page size of the object is 4096 bytes, functions start, functiona and function b are in one page, functionc and functiond are in another page, and functionc is in a unique page.

In one implementation, the instrumented and uninstrumented code have identical function addresses. Consider the following mappings used to instrument functione while leaving the remaining functions uninstrumented:

| code page | virtual address | uninstrumented phys address | instrumented phys address |
|---|---|---|---|
| 0 | 0x10000000 | 0x50400000 | N/A |
| 1 | 0x10001000 | 0x40003000 | N/A |
| 2 | 0x10002000 | 0x84120000 | 0x9342000 |

Since the pages for start, functiona, functionb, functionc, and functione are left uninstrumented, there is no need to have an instrumented version of the page. Because we are interested in instrumenting functione, there is an instrumented version and uninstrumented version of that page. To enable instrumentation, the virtual address mapping for that page is changed to physical address 0x9342000. To remove instrumentation, the virtual address mapping is changed back to 0x8412000.

Many systems provide a mechanism of segmentation. For example, on the AIX operating system files may be mapped into segments. This allows two segments that have the same virtual addresses, but different physical addresses, so that toggling between instrumented code and non-instrumented code may be effected by changing the segment mapping. This is very efficient when a segment covers a large range of pages, because the virtual-to-physical mappings for a number of pages may be carried out in one step.

Referring to FIG. 7 with FIG. 6, injecting monitoring code 612b into the software entity (block 310) may be carried out by switching, from the interrupt handler 614 after an interrupt, to the second instance 606b of the software in the second memory space 630 (block 702) and providing state information stored from executing the first instance of the software entity 606a in the first memory space 620 to the second instance 606b (block 704). Collecting behavior data by utilizing the monitoring code (block 314) is carried out by executing the second instance 606b of the software entity (block 706).

Removing the monitoring code 612b (block 318) may be carried out by providing state information stored from executing the second instance 606b of the software entity to the first instance 606a after returning from the second interrupt (block 708) and executing from the interrupt handler 614, after a second interrupt, the first instance 606a of the software from the first memory space 620 (block 710). Removing the monitoring code may also include causing the second interrupt.

In some embodiments, the method includes modifying the monitoring code between iterations in dependence upon the collected performance data samples. Consider a function functionc which is sometimes called by a function functiona and sometimes called by a function functionb. If the system determines that functionc executes a short time (e.g. 100 cycles) when called by functiona and a long time (e.g. 10,000 cycles) when called by functionb, additional measurements may be included in instrumentation specifically for calls to functionc from functionb, but not from functiona. The additional instrumentation may be for any measurements as will occur to those of skill in the art, such as, for example, picking up cache miss counts, branch mispredict behavior, etc.

It should be understood that the inventive concepts disclosed herein are capable of many modifications. To the extent such modifications fall within the scope of the appended claims and their equivalents, they are intended to be covered by this patent.

What is claimed is:

1. A method for determining performance of a software entity, the method comprising:
   allowing extended execution of the software entity without monitoring code;
   sampling behavior data for the software entity over a period of time, comprising:
      injecting monitoring code at one or more pre-selected locations into the software entity to instrument the software entity;
      generating one or more representative samples of typical behavior data by executing the monitoring code in its entirety; and
      collecting the one or more representative samples of typical behavior data over the period of time;
   removing the monitoring code;
   repeatedly performing iterations of the allowing extended execution and the sampling behavior data steps for ensuring the one or more collected samples of typical behavior data is sufficient for diagnosing performance of the software entity,
   the ensuring the collected samples of typical behavior data is sufficient comprising:
      profiling the representative samples of typical behavior data to ensure randomness;
      using regular and irregular intervals to collect the samples of typical behavior data; and
      maintaining a ratio of execution of instances of the software entity without the monitoring code to execution of instances of the software entity with the monitoring code, wherein the ratio comprises at least 10:1 or higher instances of execution; and
   modifying the monitoring code between iterations in dependence upon the collected performance data samples;
   wherein a first, non-instrumented instance of the software is mapped to a first memory space using virtual memory techniques and a second, instrumented instance of the software with the monitoring code added is mapped to a second memory space using virtual memory techniques,
   wherein the first non-instrumented instance and the second instrumented instance have a same virtual address bur different physical addresses such that toggling between the first non-instrumented instance and the second instrumented instance may be effected by changing the mapping.

2. The method of claim 1 further comprising analyzing the one or more collected samples of typical behavior data to diagnose the performance of the software entity.

3. The method of claim 1 wherein the sampling the behavior data for the software entity comprises sampling the behavior data for the software entity upon expiration of a counter and/or after a pre-defined duration of time has elapsed.

4. The method of claim 1 wherein: the injecting the monitoring code into the software entity comprises invoking from an interrupt handler, upon an interrupt, a monitoring software module comprising the monitoring code;
   the collecting the one or more representative samples of typical behavior data by utilizing the monitoring code comprise:
   executing the software entity; and
   providing state information at interrupt to the monitoring software module;
   and the removing the monitoring code comprises returning control from the monitoring software module to the interrupt handler.

5. The method of claim 1 wherein:
the injecting the monitoring code into the software entity comprises switching, from an interrupt handler, after an interrupt, to the second instance of the software in the second memory space and providing state information stored from executing the first instance of the software entity in the second memory space to the second instance;
the collecting the one or more representative samples of typical behavior data by utilizing the monitoring code comprises executing the second instance of the software entity; and
the removing the monitoring code comprises executing from the interrupt handler, after a second interrupt, the first instance of the software from the first memory space and providing state information stored from executing the second instance of the software entity to the first instance after returning from the second interrupt.

6. the method of claim 5 wherein the removing the monitoring code further comprises causing the second interrupt.

7. A computer program product for determining performance of a software entity, the computer program product comprising:
a non-transitory computer-readable medium having computer usable program code embodied therewith, the computer usable program code comprising:
computer program instructions for allowing extended execution of the software entity without monitoring code;
computer program instructions for sampling behavior data for the software entity over a period of time, comprising:
computer program instructions for injecting monitoring code at one or more pre-selected locations into the software entity to instrument the software entity;
generating one or more representative samples of typical behavior data by executing the monitoring code in its entirety; and
collecting the one or more representative samples of typical behavior data over the period of time;
computer program instructions for removing the monitoring code;
computer program instructions for repeatedly performing iterations of the allowing extended execution and the sampling behavior data steps for ensuring the one or more samples of typical behavior data is sufficient for diagnosing performance of the software entity,
the ensuring the collected samples of typical behavior data is sufficient comprising:
computer program instructions for profiling the representative samples of typical behavior data to ensure randomness;
computer program instructions for using regular and irregular intervals to collect the samples of typical behavior data;
and computer program instructions for maintaining a ratio of execution of instances of the software entity without the monitoring code to execution of instances of the software entity with the monitoring code, wherein the ratio comprises at least 10:1 or higher instances of execution; and
computer program instructions for modifying the monitoring code between iterations in dependence upon the collected performance data samples;
wherein a first non-instrumented instance of the software is mapped to a first memory space using virtual memory techniques and a second, instrumented instance of the software with the monitoring code added to a second memory space using virtual memory techniques, and
wherein the first non-instrumented instance and the second instrumented instance have a same virtual address but different physical addresses such that toggling between the first non-instrumented instance and the second instrumented instance may be effected by changing the mapping.

8. The computer program product of claim 7 further comprising computer program instructions for analyzing the one or more collected samples of typical behavior data to diagnose the performance of the software entity.

9. The computer program product of claim 7 wherein the computer program instructions for sampling the behavior data for the software entity comprise computer program instructions for sampling the behavior data for the software entity upon expiration of a counter.

10. The computer program product of claim 7 wherein:
the computer program instructions for injecting the monitoring code into the software entity comprise computer program instructions for invoking from an interrupt handler, upon an interrupt, a monitoring software module comprising the monitoring code
the computer program instructions for collecting the one or more representative samples of typical behavior data resulting from the execution of the software entity by utilizing the monitoring code comprise:
computer program instructions for executing the software entity; and
computer program instructions for providing state information at interrupt to the monitoring software module; and
the computer program instructions for removing the monitoring code comprise computer program instructions for returning control from the monitoring software module to the interrupt handler.

11. The computer program product of claim 7, wherein
the computer program product is configured for use with a data processing system wherein the computer program instructions for injecting the monitoring code into the software entity comprise computer program instructions for switching, from an interrupt handler, after an interrupt, to the second instance of the software in the second memory space and providing state information stored from executing the first instance of the software entity in the second memory space to the second instance;
the computer program instructions for collecting the one or more representative samples of typical behavior data resulting from execution of the software entity by utilizing the monitoring code comprise computer program instructions for executing the second instance of the software entity; and
the computer program instructions for removing the monitoring code comprise computer program instructions for executing from the interrupt handler, after a second interrupt, the first instance of the software from the first memory space and providing state information stored from executing the second instance of the software entity to the first instance after returning from the second interrupt.

12. The computer program product of claim 11 wherein the computer program instructions for removing the monitoring code further comprise computer program instructions for causing the second interrupt.

13. A data processing system for determining performance of a software entity, the system comprising:
- a processor; and
- a computer memory operatively coupled to the processor, the computer memory having disposed within it:
- computer program instructions for allowing extended execution of the software entity without monitoring code;
- computer program instructions for sampling behavior data for the software entity over a period of time, comprising:
- computer program instructions for injecting monitoring code at one or more pre-selected locations into the software entity to instrument the software entity;
- computer program instructions for generating one or more representative samples of typical behavior data by executing the monitoring code in its entirety; and
- computer program instructions for collecting the one or more representative samples of typical behavior data over the period of time;
- computer program instructions for removing the monitoring code;
- computer program instructions for repeatedly performing iterations of the allowing extended execution and the sampling of behavior data steps for ensuring the one or more collected samples of typical behavior data is sufficient for diagnosing the performance of the software entity,
- the ensuring the collected samples of typical behavior data is sufficient comprising:
- computer program instructions for profiling the representative samples of typical behavior data to ensure randomness;
- computer program instructions for using regular and irregular intervals to collect the samples of typical behavior data and
- and computer program instructions for maintaining a ratio of execution of instances of the software entity without the monitoring code to execution of instances of the software entity with the monitoring code, wherein the ratio comprises at least 10:1 or higher instances of execution; and
- computer program instructions for modifying the monitoring code between iterations in dependence upon the collected performance data samples;
- wherein a first non-instrumented instance of the software is mapped to a first memory space using virtual memory techniques and a second, instrumented instance of the software with the monitoring code added to a second memory space using virtual memory techniques, and
- wherein the first non-instrumented instance and the second instrumented instance have a same virtual address bur different physical addresses such that toggling between the first non-instrumented instance and the second instrumented instance may be effected by changing the mapping.

14. The data processing system of claim 13, wherein:
- the computer program instructions for injecting the monitoring code into the software entity comprise computer program instructions for invoking from an interrupt handler, upon an interrupt, a monitoring software module comprising the monitoring code;
- the computer program instructions for collecting the one or more representative samples of typical behavior data resulting from execution of the software entity by utilizing the monitoring code comprise:
- computer program instructions for executing the software entity;
- and computer program instructions for providing state information at interrupt to the monitoring software module; and
- the computer program instructions for removing the monitoring code comprise computer program instructions for returning control from the monitoring software module to the interrupt handler.

15. The data processing system of claim 13, wherein the computer program product is configured for use with a data processing system wherein
- the computer program instructions for injecting the monitoring code into the software entity comprise computer program instructions for switching, from an interrupt handler, after an interrupt, to the second instance of the software in the second memory space and providing state information stored from executing the first instance of the software entity in the second memory space to the second instance;
- the computer program instructions for collecting the one or more representative samples of typical behavior data resulting from the execution of the software entity by utilizing the monitoring code comprise computer program instructions for executing the second instance of the software entity; and
- the computer program instructions for removing the monitoring code comprise computer program instructions for executing from the interrupt handler, after a second interrupt, the first instance of the software from the first memory space and providing state information stored from executing the second instance of the software entity to the first instance after returning from the second interrupt.

* * * * *